US011343348B1

(12) United States Patent
Stevens et al.

(10) Patent No.: US 11,343,348 B1
(45) Date of Patent: May 24, 2022

(54) REAL-TIME MESSAGE DELIVERY AND UPDATE SERVICE IN A PROXY SERVER NETWORK

(71) Applicant: Akamai Technologies, Inc., Cambridge, MA (US)

(72) Inventors: Matthew J. Stevens, Lexington, MA (US); Michael G. Merideth, Carrboro, NC (US); Nil Alexandrov, Cambridge, MA (US); Andrew F. Champagne, Ware, MA (US); Brendan Coyle, Sudbury, MA (US); Timothy Glynn, Malden, MA (US); Mark A. Roman, Arlington, MA (US); Xin Xu, Waltham, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/306,199

(22) Filed: May 3, 2021

Related U.S. Application Data

(60) Provisional application No. 63/173,938, filed on Apr. 12, 2021.

(51) Int. Cl.
| | |
|---|---|
| *H04L 65/80* | (2022.01) |
| *H04L 67/568* | (2022.01) |
| *H04L 67/01* | (2022.01) |
| *H04L 67/02* | (2022.01) |
| *H04L 67/566* | (2022.01) |
| *G06F 12/0813* | (2016.01) |
| *G06F 21/53* | (2013.01) |

(52) U.S. Cl.
CPC .......... *H04L 67/2842* (2013.01); *H04L 67/02* (2013.01); *H04L 67/2833* (2013.01); *H04L 67/42* (2013.01)

(58) Field of Classification Search
USPC ....................................................... 709/203
See application file for complete search history.

(56) References Cited

U.S. PATENT DOCUMENTS

| | | | |
|---|---|---|---|
| 6,108,703 | A | 8/2000 | Leighton et al. |
| 7,058,706 | B1 | 6/2006 | Iyer et al. |
| 7,096,263 | B2 | 8/2006 | Leighton et al. |
| 7,096,266 | B2 | 8/2006 | Lewin et al. |
| 7,111,057 | B1 | 9/2006 | Wein et al. |

(Continued)

OTHER PUBLICATIONS

"Hello all, Does Akamai support MPEG-DASH with a costume manifest." Downloaded on Jan. 25, 2021, 2 pages. Dec. 9, 2015 at 1:08 pm (/customers/s/question/0D50f00005RtrC3CAJ/hello-all-does-akamai-support-mpegdash-with-a-costume-manifest-).

(Continued)

*Primary Examiner* — Jude Jean Gilles

(57) ABSTRACT

This patent document describes technology for providing real-time messaging and entity update services in a distributed proxy server network, such as a CDN. Uses include distributing real-time notifications about updates to data stored in and delivered by the network, with both high efficiency and locality of latency. The technology can be integrated into conventional caching proxy servers providing HTTP services, thereby leveraging their existing footprint in the Internet, their existing overlay network topologies and architectures, and their integration with existing traffic management components.

19 Claims, 10 Drawing Sheets

(56) References Cited

U.S. PATENT DOCUMENTS

| | | |
|---|---|---|
| 7,240,100 B1 | 7/2007 | Wein et al. |
| 7,251,688 B2 | 7/2007 | Leighton et al. |
| 7,274,658 B2 | 9/2007 | Bornstein et al. |
| 7,293,093 B2 | 11/2007 | Leighton et al. |
| 7,484,002 B2 | 1/2009 | Swildens et al. |
| 7,523,181 B2 | 4/2009 | Swildens et al. |
| 7,574,499 B1 | 8/2009 | Swildens et al. |
| 7,603,439 B2 | 10/2009 | Dilley et al. |
| 7,716,367 B1 | 5/2010 | Leighton et al. |
| 7,725,602 B2 | 5/2010 | Liu et al. |
| 7,912,978 B2 | 3/2011 | Swildens et al. |
| 7,925,713 B1 | 4/2011 | Day et al. |
| 7,996,531 B2 | 8/2011 | Freedman |
| 8,195,831 B2 | 6/2012 | Swildens et al. |
| 8,423,662 B1 | 4/2013 | Weihl et al. |
| 9,509,804 B2 | 11/2016 | Stevens et al. |
| 9,531,720 B2 | 12/2016 | Zhang et al. |
| 9,641,640 B2 | 5/2017 | Flack et al. |
| 9,648,125 B2 | 5/2017 | Flack et al. |
| 9,654,579 B2 | 5/2017 | Stevens et al. |
| 9,658,967 B2 * | 5/2017 | Brandt ............... G06F 12/121 |
| 9,667,747 B2 | 5/2017 | Shotton et al. |
| 9,807,190 B2 | 10/2017 | Flack et al. |
| 9,813,515 B2 | 11/2017 | Flack et al. |
| 9,880,936 B2 * | 1/2018 | Athalye ............ G06F 16/2455 |
| 10,063,652 B2 | 8/2018 | Flack et al. |
| 10,404,820 B2 | 9/2019 | Flack et al. |
| 10,445,380 B2 * | 10/2019 | Mosko ............... H04L 45/742 |
| 10,547,703 B2 | 1/2020 | Flack et al. |
| 10,667,172 B2 | 5/2020 | Ingerman |
| 2002/0184444 A1 * | 12/2002 | Shandony .......... G06F 16/9574 |
| | | 711/135 |
| 2021/0185142 A1 * | 6/2021 | Paduroiu ........... G06F 12/0868 |
| 2021/0240817 A1 * | 8/2021 | Duan ................. G06F 12/0813 |

OTHER PUBLICATIONS

Akamai, "Nintendo, "Super Mario Run" simultaneous distribution in 150 countries and regions around the world." Downloaded on Jan. 25, 2021, 3 pages. Available at: https://www.akamai.com/jp/ja/our-customers/customer-stories-nintendo-super-mario-run.jsp.

Loreto, S. et al., "Known Issues and Best Practices for the Use of Long Polling and Streaming in Bidirectional HTTP", IETF, RFC 6202, Apr. 2011, 19 pages.

* cited by examiner

REAL-TIME MESSAGE DELIVERY AND UPDATE SERVICE IN A PROXY SERVER NETWORK

BACKGROUND

Technical Field

Among other things, this application generally relates to distributed computing systems and to providing real-time messaging flow and content updates in such distributed computing systems, including in particular proxy server networks.

Brief Description of the Related Art

More and more devices are network-enabled and connected systems increasingly rely on real-time message flows over the Internet to and from such devices. Traditionally, delivery of content over the Internet has been significantly enhanced by the deployment of content delivery networks (CDNs). CDNs are essentially distributed computing systems, typically composed of large collections of proxy servers that form an overlay network and provide HTTP and related services. The proxy servers typically provide a caching function, storing content that was fetched from upstream in the network and ultimately from a remote origin server. There are many well-known techniques (such as setting time to live or TTL values, if-modified-since or IMS commands, serve-stale, etc.) to manage the coherency of the cached content against the origin (and other proxy servers) and to control refresh operations, all the while attempting to optimize performance.

Traditional CDN architectures can accommodate real-time message flows to some extent, but are not well-suited to doing so. This is in significant part because traditional CDN architectures rely on assigning a cache lifetime to pieces of content. Assigning cache lifetimes works poorly if one wants to invalidate cached content only if and when the corresponding content changes at the source, which is a key attribute of real-time messaging.

There have been efforts to address this problem. For example, HTTP long polling and H2 server push can be used to provide content updates. But, they are resource intensive if adopted at the scale of a distributed computing system.

There have been efforts to enhance CDN platforms with add-on services that could provide the required functionality. See, for example U.S. Pat. Nos. 9,648,125, 9,813,515, 9,641,640, 9,667,747, 9,654,579, 10,063,652, and 10,667,172, the teachings of each of which are hereby incorporated by reference in their entireties. Some of these add-on services leverage publish-subscribe protocols (e.g., MQTT) that are designed for real-time messaging. While those services may work well, typically they must be built from the ground up and integrated into the CDN, requiring new subsystems and introducing additional complexity.

It is desirable to take advantage of existing HTTP proxy server deployments, and well-known technologies and paradigms for content delivery (such as cache tiering and inter-cache-protocols, load balancing, prefetching, markup language/presentation layer integration). It is likewise desirable to fully leverage well-known and supported HTTP protocols and related ecosystems of software components.

This patent document presents technology for real-time messaging, including prompt entity update notifications, that addresses the above goals. The teachings hereof can be used to provide real-time messaging and update notification services from currently deployed HTTP proxy servers (modified in accord with the teachings hereof) while leveraging widely supported HTTP entity transfer paradigms.

The teachings hereof improve distributed computing systems because they enable distributed computing systems (such as CDNs) to provide real-time messaging and update services in a new, more efficient manner. The teachings presented herein improve the functioning of a computer system itself, improving the caching function in an individual server as well as that of a larger distributed system composed of many such servers. Those skilled in the art will understand these and other improvements from the teachings hereof.

More information about CDN technologies, including examples of proxy server technologies, can be found in the following documents, the teachings of which are hereby incorporated by reference in their entireties: U.S. Pat. Nos. 6,108,703, 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

BRIEF SUMMARY

This section describes some pertinent aspects of this invention. They are illustrative, not exhaustive, and they are not a definition of the invention. The claims of any issued patent define the scope of protection.

This patent document describes a technology for a real-time addressable messaging and update service in a large, HTTP-based overlay network of proxy servers. The service can be used to distribute real-time change notifications about entities cached in the network (content such as images, JSON objects, messages, or any other type of data), with both high efficiency and locality of latency.

The technology can be integrated into HTTP proxy servers, thereby leveraging their existing footprint in currently-deployed platforms, their network relationships with each other, and their existing integration with other traffic management components, such as DNS-based routing/load balancing.

To enable these features, a conventional HTTP proxy server is modified to provide a dual interface for each cacheable entity for which the feature is enabled. Put another way, a cacheable entity enabled for this feature is associated with two addressable resources.

The first resource is the typical resource, known in the art, which is addressable at a universal resource indicator (URI) that is ultimately defined by an origin and associated content provider. A client request addressed to this URI (the 'entity' URI) returns the cached entity (or a newly fetched version, if not in cache). The entity encompasses any type of content. The entity might be, for example, an HTML object, an image/icon on a web page or app, a script, API data, JSON formatted data, MQTT messages destined for an app or an IoT device, software or firmware update, blob, and the like.

The second resource is a novel, synthetic resource that provides a real-time notification channel for updates to the cached entity. The URI for the second resource—referred to as the 'notification-channel' URI—can be created by the proxy server (or possibly other system component) by applying a defined formula, transform, or computation to the 'entity' URI, thereby yielding a 'notification-channel' URI. Put another way, the notification-channel URI is computable from the entity URI. Likewise, the entity URI can be computed from the notification-channel URI.

The proxy server's local cache is configured such that the store entry addressable via the 'entity' URI holds the entity (entity store entry). The store entry for the 'notification-channel' URI holds a data representation of clients known to the proxy server to have interest in the entity, at least within some recent time period, and of upstream parent servers and/or origin servers from which the proxy server has fetched the entity in the past (again, at least within some recent time period).

End user clients—and origins—can directly interact with the dual interface and take advantage of its features. For example, end user clients may use the dual interface to interact with a proxy server (and the proxy server network generally) over the so-called 'last mile', to the extent such end user clients are aware of and support it. Such an end user client can express interest by directly addressing the 'notification-channel' URI using conventional HTTP message exchange operations, or protocols, among other things. In general, then, the term 'client' used herein includes end user clients as a particular subset of clients.

It is also possible that (in some implementations) the dual interface and its features are used wholly within a proxy server network to manage entity updates, e.g., the 'client' in this case referring only to requesting (typically downstream) proxy servers. For example, end user HTTP clients can express interest in being notified of updates to a given entity using conventional techniques addressed to the entity URI, such as an HTTP 1.1 long poll, H2 server push, and the like. The edge proxy server translates these requests to the dual interface internal to the proxy server network. Thus end user clients still benefit indirectly.

Moreover, end user clients that do not use an HTTP protocol can be accommodated too. In such cases, the end user client and an edge proxy server can communicate using a non-HTTP protocol (e.g., MQTT, AMQP, Kafka-compatible protocol). The proxy server adapts the messaging to the HTTP dual-interface model for communication upstream (and otherwise internal to the proxy server network). The end user client is served the entity, notifications of updates, and even updated entities, using the non-HTTP protocol natively supported by the end user client.

Typically, a given proxy server acts on behalf of all its attached (or recently attached) clients by expressing interest upstream about receiving update notifications for an entity, whether upstream to another proxy server, origin, or otherwise. This feature is referred to as coalescing interest, or equivalently as collapsed forwarding. Proxy server networks are often arranged hierarchically, so a given proxy server would typically express coalesced interest to its cache parent, but doing so to a peer or other component is also possible.

When a given proxy server receives notice of an update to an entity from upstream, it notifies attached or recently attached clients to the extent possible. This usually means clients recorded in the associated 'notification-channel' store entry. The proxy server initiates a forward request for the entity in order to update its own 'entity' store entry, in a prefetch operation. Then the notified clients can request the entity from the proxy server at the entity URI.

Client "writes" are also possible. When a proxy server receives notice of an update to an entity by virtue of a client "write" (such as an authorized HTTP PUT or POST to the entity URI), the proxy server proxies the write operation upstream. The proxy server can also notify the clients recorded in its associated 'notification-channel' store entry, without waiting. Assuming the upstream "write" is successful at origin, an update notification may propagate back down to the given proxy server, which suppresses the update notification in this instance. If the given proxy is notified that the write failed or given a different entity from upstream, then it can issue another update notification to its clients.

In this way, entity updates can occur anywhere in the system and propagate in accord with the established cache hierarchies or other topologies. An update to an entity received anywhere in the system can propagate throughout, cascading from each proxy server to its clients with interest of record.

The foregoing merely highlights some pertinent examples and implementations of the technology. More detail is provided below.

The claims are incorporated by reference into this section in their entirety.

BRIEF DESCRIPTION OF THE DRAWINGS

The invention will be more fully understood from the following detailed description taken in conjunction with the accompanying drawings, in which.

Figure 1:
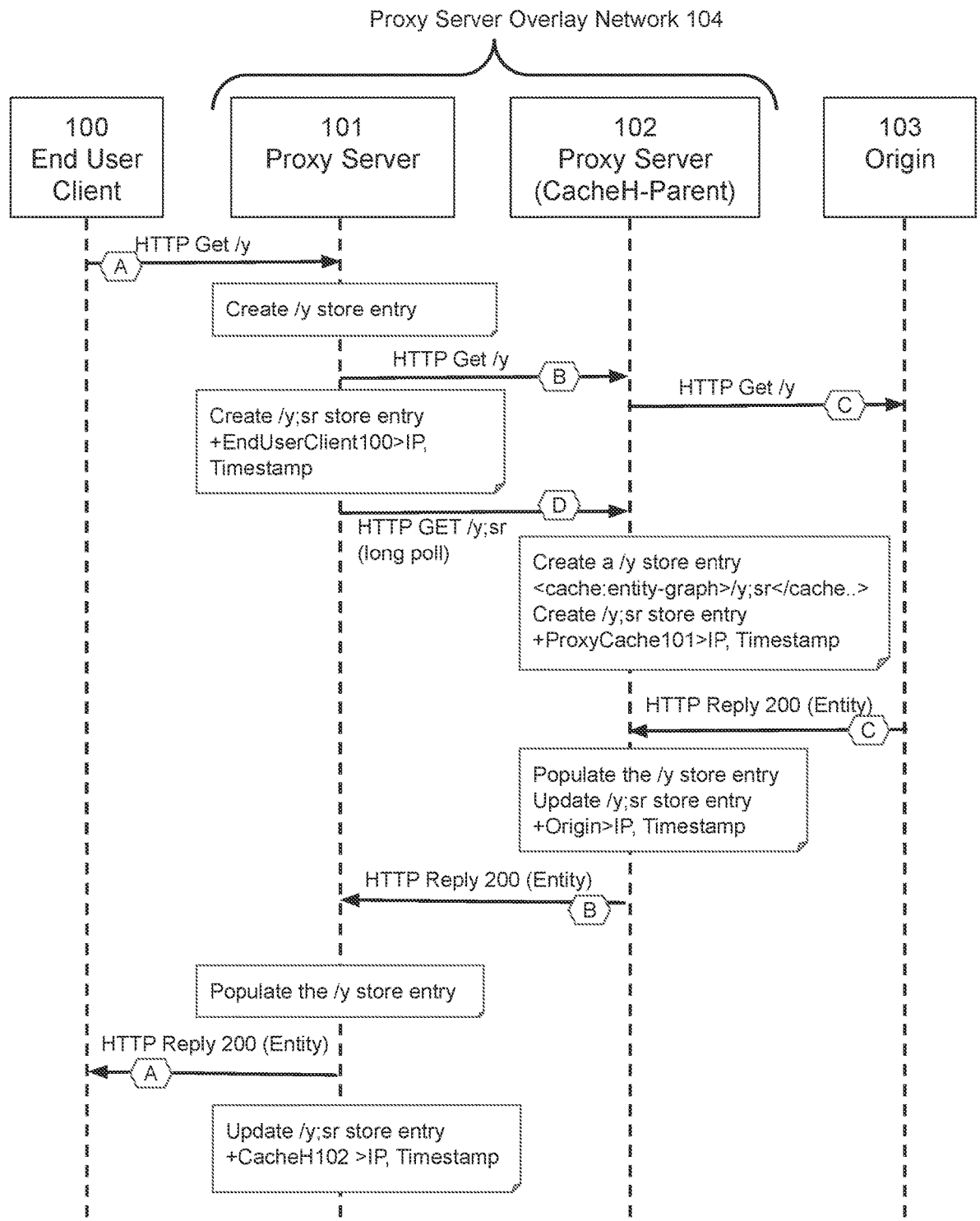
FIGS. 1-2 are sequence diagrams illustrating the building of an entity interest graph, where the end user client does not use the notification channel directly, in accordance with one embodiment of the teachings hereof.

Numerical labels are provided in the FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URI, XML, AJAX, CSS, GraphQL, HTTP versions 1.x and 2 (HTTP version 2 is referred to as HTTP/2 or H2 herein), HTTP over QUIC, MQTT, TCP/IP, and UDP, is assumed. Likewise, basic familiarity with well-known database technologies and terms, such as relational databases (RDBMS), SQL databases and queries, NoSQL databases and/or key-value approaches, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Dual Interface for Addressable Content Entities in a Proxy Server

The invention can be practiced in the context of a distributed set of caching proxy servers, which may be organized as an overlay network on the Internet. As known in the art, a given proxy server with a local cache can be deployed as an intermediary between end user clients and origin servers, typically presenting an HTTP interface to both. An origin server hosts content under a domain name, e.g., example.com. Such content collectively forms, e.g., a website, web application, API, and/or data feed, or the like. Of particular relevance here is rapidly changing data that persists for indefinite time periods (e.g., making it hard to set a time to live TTL value), such as a real-time update to a sports score, a sensor value being reported by a connected device, or a back-end database value that is overwritten from time to time (product inventory, flight status, etc.).

The content may consist of commands and directives and push notifications issued to connected devices (or to particular applications running on such devices), and replies or status updates thereto.

End user client requests for content made available by the origin are directed to a proxy server network and to a particular proxy server through the application of DNS aliasing, anycasting, or any other of a variety of well-known techniques. Alternatively, the proxy server could be configured as a transparent cache with policy-based routing applied to route packets through the cache.

Regardless of how the client request is routed to it, the proxy server provides an HTTP based interface that receives end user client requests. The proxy server responds to end user client HTTP requests by serving the requested content from cache, assuming the cached content is valid (unexpired) and otherwise permissible under configured policy, or by fetching the requested content from origin in a forward request operation. Cache hierarchies and other strategies may be used.

With the foregoing by way of context, in accord with the teachings of this patent document, an HTTP proxy server is modified to provide a real-time messaging and content update notification services. As an initial matter, it should be understood that any kind of content can be used with the system, including all those mentioned before. In addition, the system is well adapted to handle content that may be considered 'messages' between machines, such as commands, directives, push notifications, status queries/reports, and other messages issued to connected devices (or to particular applications running on such devices), and replies or responses thereto. Hence, it should be understood that when the term 'entity' is used herein, it refers to an entity as defined in well-known HTTP protocol standards, but the entity may represent any type or form of content.

A proxy server modified in accord with the teachings hereof can expose two resources for each addressable content entity. The first interface is the conventional resource for addressing an entity. This entity may be public or private (whether for a single client or a given class of clients). The second is a synthetic resource logically coupled to the first, but used for addressing the notification channel for updates to the entity. Each of the two resources are addressable using HTTP message exchanges and protocols, including conventional HTTP methods (such as GET, POST, PUT). The two resources in effect form a dual HTTP interface for an entity. Note that for purposes of illustration, an HTTP interface (specifically HTTP 1.1, with long polling) will be presented first. Later in this document, the use and adaptation to other protocols will be explained. Suffice to say that the teachings hereof can apply, with limitation, to a wide variety of protocols, including H2 (e.g., with server push); a GraphQL interface using a WebSocket sub-protocol; or even a non-HTTP protocol such as MQTT/AMQP.

Details of the dual interface are set forth below using HTTP conventions:

Entity Interface

A conventional resource, e.g., 'y', addressable at a URI, such as:

https://example.com/ . . . /y

This URI is referred to herein as the 'entity' URI.

Associated with a cache store entry that holds the data that makes up the entity.

An HTTP GET to the entity URI returns the cached entity, if it exists and is fresh and otherwise valid to serve; otherwise the proxy server goes forward via cache hierarchy, and all the way to origin as needed.

If a client sends an HTTP request to the entity interface, it has implicitly expressed interest in receiving notifications that the entity has been updated. Hence, the proxy server can create an associated notification channel interface, with store entry, and add the client's information, e.g., in an entity interest graph associated with the notification channel interface, which is described next.

The entity/y may be any type of content, such an HTML object, an image/icon on a web page or app, a script, API data, JSON formatted data, MQTT or other formatted messages, software or firmware update, blob, and the like. In the messaging use case, the entity URI may correspond to a given topic (e.g., /y means a/topic) and the entity data itself may represent a published message on that given topic. The entity URI could also correspond to a defined subscriber or class of subscribers, the entity data representing message(s) being transmitted thereto.

Notification Channel Interface

A novel synthetic resource of the form '/y;solicit-response' or '/y:sr' for short, addressed at a second URI, such as:

https://example.com/ . . . /y;solicit-response
https://example.com/ . . . /y;sr (abbreviated form)

This URI is referred to herein as the 'notification-channel' URI.

This synthetic resource provides a real-time notification channel for updates to the entity. It is coupled to the entity resource. It adds to proxy server functionality to block on an entity until the entity changes. Implemented as a long poll.

Associated with a cache store entry that holds data recording client interest in receiving notifications of updates to the entity (e.g., interest in receiving entity updates). Such data can be stored in the form of an entity interest graph.

An HTTP GET (or POST) to the notification-channel URI is handled as a long poll for updates to the entity. As such, it returns a notification when the entity (at the associated entity URI) has been updated. (It does not necessarily return the entity itself, although it could in some implementations. If not, a client issues an HTTP request to the entity URI to obtain the updated entity.)

Sending an HTTP request to the notification-channel URI is an explicit expression of client interest in getting notifications of updates to the entity. Hence, the proxy server can add the client to the entity interest graph. To obtain notifications for its client(s), the proxy server issues a forward HTTP request, e.g., to the notification-channel URI of its parent proxy server (or origin, if supported). If other clients have already expressed interest then the proxy server can simply add the client to be notified when the existing forward request returns (known as coalesced interest or collapsed forwarding).

Preferably, the proxy server network is configured such that proxy servers know how to compute the notification-channel URI from the entity URI, and preferably the entity URI from the notification-channel URI. More specifically, the proxy server can compute the notification-channel URI from the entity URI by applying a defined formula, computation, or other transform to the entity URI. In the above example, appending a reserved string ';solicit-response' or ';sr' to the entity URI serves the purpose, but this is not limiting.

Cache Store Entries

Conventionally, a proxy server receives an HTTP request specifying a particular URI and calculates a cache key using some formula, which may take into account the protocol, HTTP method (POST/GET/PUT) and other factors such as network partitioning. Cache keys address store entries in the cache, be it in disk, SSD, RAM, or any other form of storage.

As mentioned earlier, according to the teachings hereof, the entity resource and notification-channel resource are each associated with their own respective store entry.

More specifically, the entity resource ( . . . /y) is associated with an entity store entry, which holds the cached content representing the entity. The notification channel resource ( . . . /y;solicit-response) is associated with a distinct store entry, referred to as the notification-channel store entry. The notification-channel entry is preferably a non-cacheable store entry created as an in-memory data structure holding information of active request(s) associated with it. The notification-channel store entry is used to put all long poll requests on hold with collapsed forwarding.

Collapsed Forwarding

Collapsed forwarding relates to a situation in which multiple clients of a given proxy server request notification of updates to an entity (expressing interest, e.g., either implicitly or explicitly). Instead of making a forward request for each client, the proxy server collapses those requests into a single, consolidated forward request to its parent proxy server (or origin) in order to get such notifications on behalf of all clients together.

In the dual interface, a client long-polling mechanism can be used to explicitly address the notification channel URI at /y;solicit-response, to wait for the entity update. Such requests are preferably forced to bypass cache and hit the origin (because only origin is authoritative for entity updates). Long-polling mechanisms generally use POST method to make requests non-cacheable, though any request can be turned to non-cacheable by configuring <cache:bypass-cache> or <cache:no-store>.

It is known in the art (by others) to collapse requests for cacheable content. If multiple clients are connected to the same CDN proxy server and they simultaneously issue an HTTP GET for the same entity URI with cacheable content but unfortunately cache miss, all might go forward. But by using so-called 'make public early' features, it is known to have a proxy server create only one forward request to parent/origin and will put other content requests on hold. This collapsed forwarding behaviour is implemented by making the store entry immediately public, so all other requests for the same store entry can share the content (other requests can wait for the store entry to be populated by the response). The collapsed forwarding behavior for non-cacheable /y;solicit-response resources (the notification channel interface) can be implemented to behave similar to what make-public-early does for cacheable resources (the entity interface).

Entity Interest Graph

The entity interest graph is an example of a data structure stored in the notification-channel store entries of proxy servers to record interest in a given entity. The entity interest graph records client interest in receiving notifications of updates to the associated entity. Once a client expresses interest, the record of that client's interest may be retained for a predetermined time period (e.g., assigned a TTL), hence the graph can reflect interest within the most recent N units of time.

As noted before, a client may express interest in update notifications in a variety of ways. Assume an implicit expression of such interest: a client's entity request (HTTP GET /y) traverses through the cache hierarchy to the origin server. Likewise, a client's explicit expression of interest triggers a proxy server to record a client's information in the entity interest graph. In either case, each proxy server on the forwarding path records the information of all downlinks (e.g., end user clients or child proxy servers) and uplinks (e.g., parent proxy servers or the origin server). This information can be stored in a table or other local data structure. Collectively, the tables (or other data structures) of proxy servers across the system represent a graph of hosts (the aforementioned "entity interest graph") that have recently been involved in entity transfer in upstream and downstream for a given entity. Put another way, each proxy server maintains a piece of the entity interest graph (a node in the overall graph).

The table below is an example of a notification-channel store entry with recorded upstream and downstream interest for a given proxy server:

| Uplink/Downlink | IP | Timestamp | TTL |
|---|---|---|---|
| Downlink (Client) | 192.0.2.1 | 1593585210 | 300 |
| Downlink (Client) | 192.0.2.2 | 1593585211 | 300 |
| Uplink (Parent/Origin) | 198.51.100.1 | 1593585220 | 1200 |

The downlink timestamp indicates when the proxy server last communicated with that downlink regarding the entity. The timestamp can be expressed in seconds, or better yet in millisecond resolution (or finer). It is updated each time the proxy server receives either an entity request or a notification-channel request. The list of downlinks can be sorted by timestamp and when adding a new entry, the oldest entry might be evicted.

The downlink timestamp enables the proxy server to track active client interest. When the entries for downlinks expire, this means that the client is deemed to no longer have interest in the entity. Put another way, unless a TTL is infinite (i.e., disabled), entity interest is treated as temporary rather than permanent. If no clients have interest in the entity (or too few, e.g., under a threshold), then the proxy server might cease requesting updates from upstream. Likewise, an upstream parent proxy server reviews the age of the interest from its client proxy servers to see if update notifications are still needed. The parent proxy could also take account the number of clients for which a given child proxy server is expressing interest (if communicated up to the parent) to assess whether to expire the downlink entry, e.g., a large number of clients may cause the parent to extend the TTL. In this way, as collective client interest in a given entity fades, the entity interest graph is gradually torn down, from the clients up to the root of the hierarchy.

The uplink timestamp shows when the proxy server last expressed interest in the entity to some other server explicitly or implicitly, e.g., by forwarding the entity request /y to that parent IP address as directed by the forwarding configuration, or by issuing a request to the notification channel /y;sr. The uplink entry in the table is updated each time the entity request /y forwards (which may have changed forward uplink IP address and not just the timestamp). As directed (typically by forwarding configuration and/or DNS mapping, etc.) the proxy server can forward (via the overlay) the notification-channel requests to that recent uplink. This approach seeks to match the network communication attributes of the notification-channel with the entity-channel. As a result, the reliability of the notification-channel on that recent uplink is likely to resemble that of the entity-channel, unless conditions significantly change after the entity-channel timestamp. Connectivity failure for the notification-channel request fails fast allowing the downstream interest to be reestablished, again deferring to forwarding configuration.

A notification-channel store entry with unexpired rows shows that this node in the graph represents an active interest for at least one client. Both entity requests and notification-channel requests can reset the timestamp for all graph nodes in upstream direction to origin.

The uplink timestamp enables the proxy server to track the upstream nodes that it has notified about its interest in the entity. This information can be used in a variety of ways, such as evaluating whether the interest needs to be re-expressed (e.g., ping notification channel) to prevent the parent from dropping the proxy server from the parent's own table (as a downlink), or as a channel to use for prefreshing entities (refreshing just before entity TTL expiry), or to connect upstream without needing to locate (e.g., via a DNS lookup) a suitable parent, or for any other reason.

With the foregoing overview, more detailed message sequences will now be described with respect to FIGS. 1-6. Those Figures contain many different HTTP message exchanges, so for clarity each message exchange has been labeled with a capital letter A, B, C, and so on. In other words, an HTTP request and the corresponding HTTP reply are both identified by the same label, e.g., "A". In general the message sequencing is for illustrative purposes and may vary in operation, as those skilled in the art will understand; servers would generally be expected to process independent message exchanges in a concurrent and non-blocking manner.

Figure 2:
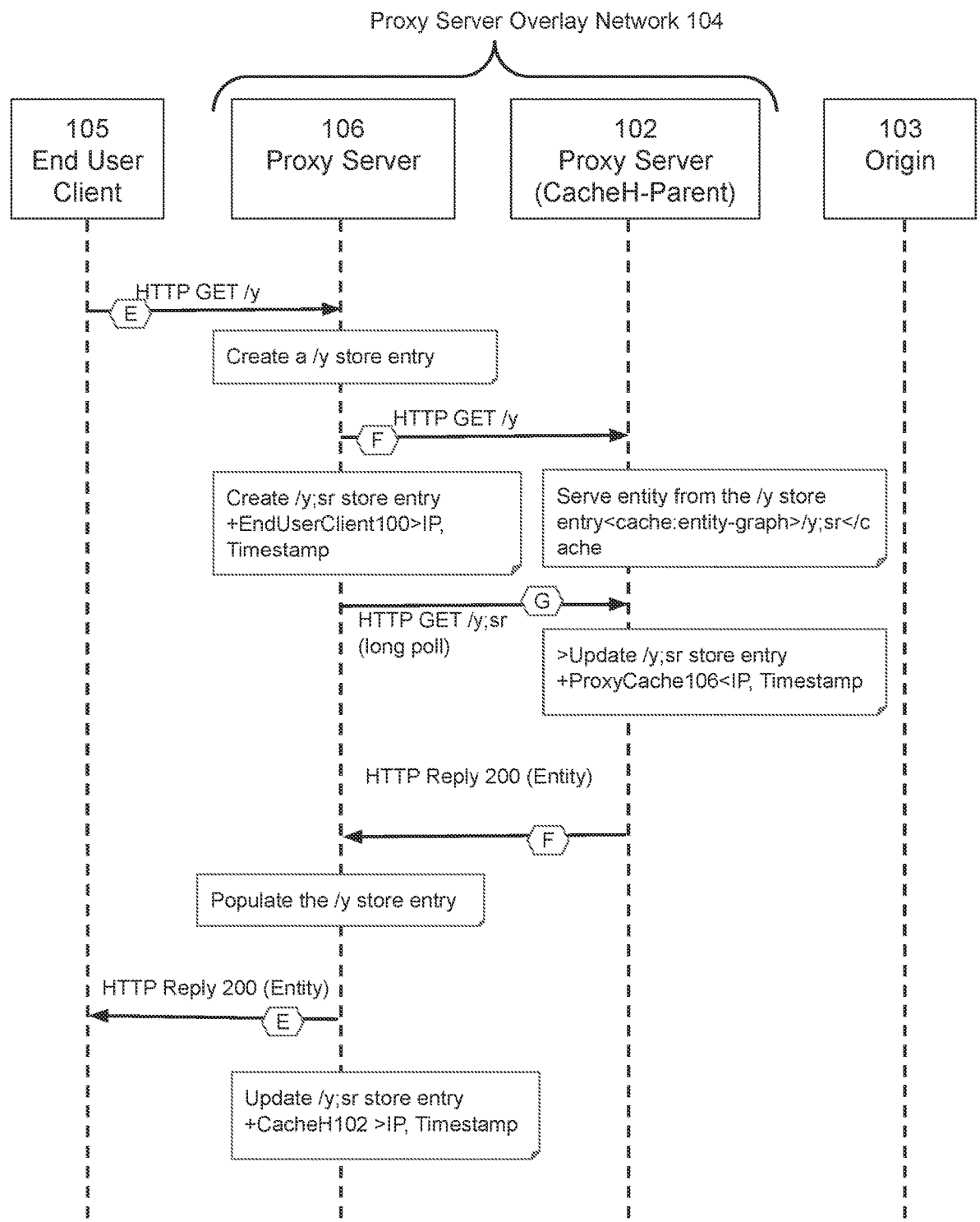

FIGS. 1 & 2: Example where End User Client and Origin do not Support Notification-Channel Interface FIG. 1 is a sequence diagram illustrating how the entity interest graph is built in the context of an HTTP end user client and origin that do not support the notification-channel interface, but instead uses conventional HTTP 1.x or 2 requests for the entity resource at the entity URI. The notification channel interface is used within the proxy server overlay network 104.

The sequence begins with the end user client 100 issuing an HTTP GET for the entity /y to the proxy server 101 at the network edge. The first request is preferably the entity request, otherwise in absence of initial entity requests all notification-channel requests on a particular proxy server can be treated as premature and rejected in some implementations. If a client does not want to issue an HTTP GET for the entity /y because it is deemed inefficient (or for some other reason), the client can first use an HTTP HEAD request for /y.

Assume the proxy server 101 has the dual interface activated for this entity with respect to upstream operations. (The diagram shows an XML configuration tag <cache:entity-graph> /y;sr </cache:entity-graph> for demonstrative purpose, such configuration of a proxy server is described e.g., in U.S. Pat. Nos. 7,240,100 and/or 9,942,363, incorporated herein by reference. However any configuration mechanism can be used.)

The proxy server 101 responds by creating a new /y store entry (entity resource). The proxy server 101 determines where to go forward. To that end, CacheH-Parent 102 is another proxy server in the overlay network 104 to which the edge proxy server 101 has been configured to go forward, e.g., by DNS lookup, static configuration, or any other technique (referred to as a "forward configuration"). Any network architecture and forward-mapping is compatible with the teachings hereof.

Next, the proxy server 101 sends a forward request for the entity (HTTP GET /y) to the CacheH-Parent 102. Concurrently, the proxy server 101 creates a new /y;sr store entry (the notification channel resource). In that store entry, the proxy server 101 can record the downlink IP address of the end user client 100 as having expressed interest in the entity, as shown in FIG. 1. The proxy server 101 also sends a forward request for entity update notifications to the CacheH-parent 102, which is shown as a long-poll on HTTP GET /y;sr. Note that the creation of the /y;sr store entry and the sending of the update notification request to /y;sr preferably is not blocking to the entity channel forward request operation. In some implementations, the proxy server 101 would defer these operations until after the entity channel message exchange is complete, e.g., to ensure that the CacheH-Server 102 is live, and/or because the update notification request is designed to include information about the latest object that the proxy server received (such as a timestamp and etag).

Receiving these requests, the CacheH-Parent 102 creates a new /y store entry and /y;sr store entry, just as the proxy server 101 did. The CacheH-Parent 102 records the downlink information (the proxy server 101 IP address and timestamp).

The CacheH-Parent 102 fetches the entity /y from the origin 103. After the successful fetch, the CacheH-Parent updates the /y;sr store entry with the origin IP address and timestamp (it is beneficial to wait until successful communication with a given origin IP address before adding it to the /y;sr store entry).

The CacheH-Parent 102 stores the entity /y in its cache and serves it to proxy server 101, which likewise caches the entity and serves it to the end user client 100, in a conventional manner.

Finally, the proxy server 101 can update its /y;sr store entry with the successful upstream information: the IP and timestamp of the CacheH-Parent 102.

FIG. 2 follows FIG. 1 in time. FIG. 2 is a sequence diagram that shows a different end user client (105) connecting to a different proxy server (106) at the edge, but issuing a request for the same entity as in FIG. 1 (/y), as well as a notification channel request to /y;sr. The proxy server 106 issues an entity channel and notification channel request to the Cache H-Parent 102 (same as in FIG. 1) Preferably, the CacheH-Parent 102 would handle both of those requests from the proxy server 106 in a concurrent, non-blocking manner. For the notification channel request, as shown in FIG. 2, the notification-channel store entry (/y;sr) is updated with the IP address of proxy server 106 and the current timestamp. For the entity channel request, because the CacheH-Parent 102 already fetched the entity /y in FIG. 1, the entity can be served from the cache of the CacheH-Parent 102, assuming it is not expired and otherwise valid to serve.

The processes depicted in FIGS. 1 and 2 would of course be repeated over time for many end user client requests, with the result being that proxy servers 101, 106 and CacheH-Parent 102 would build a record of the downlink IP addresses of end user clients and/or downstream proxy servers that had requested the entity.

Each such record is an implicit indication of client interest in receiving notification of updates to the entity. As mentioned, the records could be associated with a time to live value, based on system configuration or other contextual request attributes such as device type, network, whether the device has logged in to a service, etc.

Figure 3:
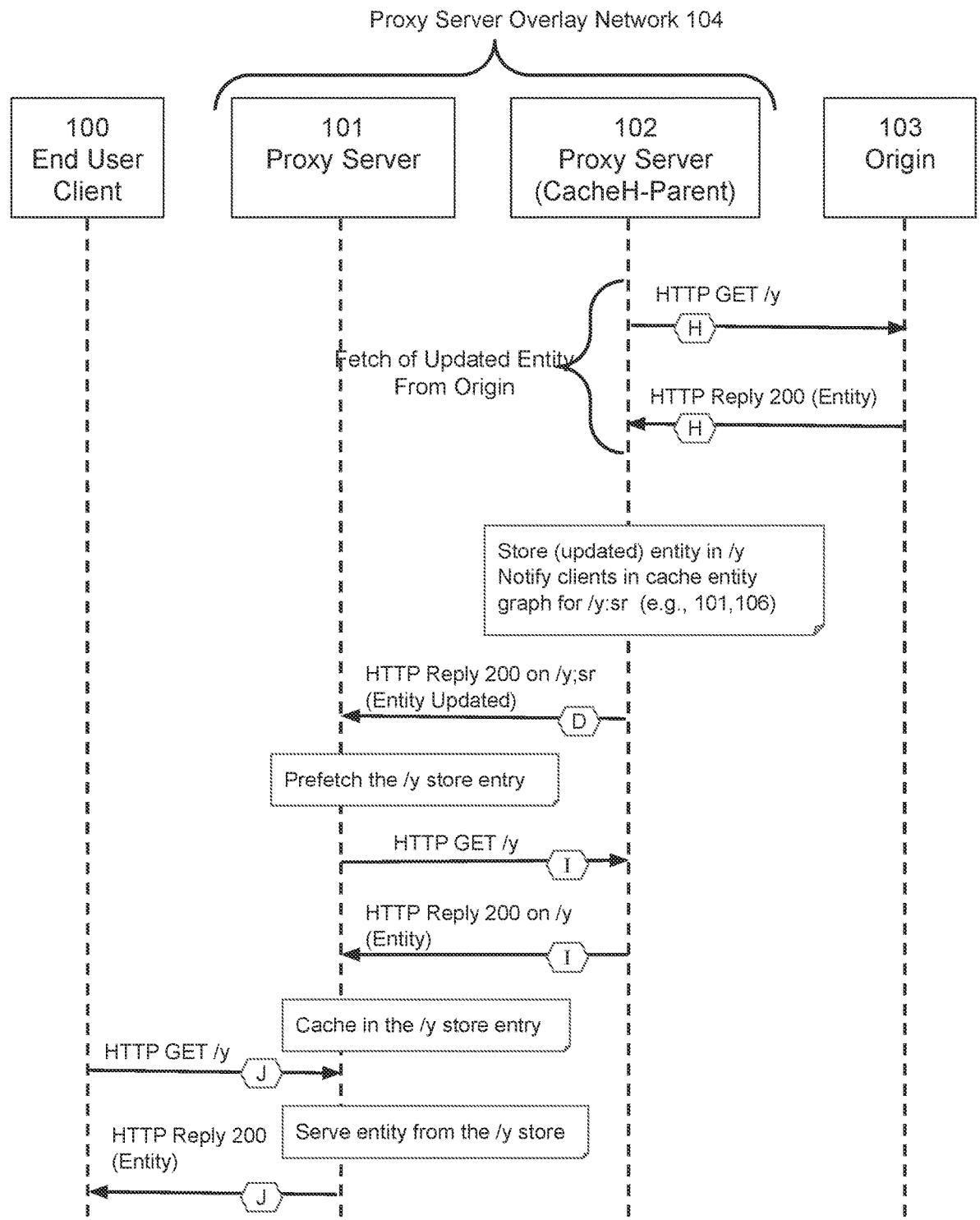
FIG. 3 is a sequence diagram illustrating notification of entity updates, in accordance with FIGS. 1-2.

Update Notification (FIG. 3)

FIG. 3 illustrates how update notifications propagate in the system following the messaging sequences in FIGS. 1-2; FIG. 3 should be viewed as a continuation following the message exchanges in FIGS. 1-2.

As an initial matter, assume that at some point in time, CacheH-Parent 102 fetches an updated entity from the origin 103. This might be triggered for any number of reasons, such as (a) CacheH-Parent 102 is configured to get the entity when its cached version's TTL is expired or nearing expiry (using an if-modified-since message), (b) CacheH-Parent 102 has an HTTP long poll to /y at the origin 103, (c) another proxy server or end user client requests the entity (not shown), causing the CacheH-parent 102 to realize it has expired.

Within the overlay network 104, the notification channel is used. Recall from FIG. 1 that proxy server 101 issued an HTTP GET /y;sr to CacheH-Parent 102 in order to get update notifications on behalf of all end user clients that have expressed interest (collapsed forwarding).

Generally speaking, notification of the update is cascaded down the hierarchy from proxy servers 102 to 101 (and 106, though not shown). The actual updated entity could be bundled with the notification, but this is not required. At each level of the hierarchy, the entity interest graph recorded in the notification-channel store entity guides the hosting proxy server 101, 102, 106 as to the downstream clients to notify about the changes. Hence, at a given proxy server in the overlay network 104, upon receiving notification of a change to an entity /y, the entity store entry in the cache for /y can be immediately invalidated, and all unexpired downstream IP addresses recorded in the entity interest graph can be notified of the existence of an update. Then the given proxy server can initiate an asynchronous prefetch request to populate the cache. To do all this, the given proxy server would compute the entity URI from the notification-channel URI, calculate the cache key and invalidate the entity store entry for the entity URI, and then issue an upstream HTTP request for a new entity representation. (Of course, if the new entity is included inline with the update notification, then it can be used to populate the cache.)

Turning specifically to FIG. 3, once notified of the update, proxy server 101 can prefetch and cache the updated entity. If end user clients supported a mechanism for notification of updates, the proxy server 101 could use it to inform them of the updated entity. But assume for FIG. 3 that end user client 100 does not support this function. The end user client 100 may instead use interval polling or long polling. Regardless, FIG. 3 shows that at a later point in time, end user client 100 sends an HTTP GET /y for the entity. Because the proxy server 101 has been notified and prefetched the updated entity, it can immediately serve it to the end user client from the cache, as shown at the bottom of FIG. 3.

Entity update notifications can be implemented as follows (by way of example and not exhaustive):

Between CacheH-Parent 102 and Origin 103: long poll or H2 server push on the entity interface.

Between the Proxy 101 and CacheH-Parent 102: long-poll or H2 server push on the notification-channel interface.

Between End User Client 100 and Proxy 101: long poll or H2 server push on the entity interface. The end user client 100 might also use interval polling, in some implementations.

(The operations relating to proxy server 106 and end user client 105 are not shown in FIG. 3 but will be apparent to those skilled in the art from the following description, as they would parallel those of proxy server 101 and end user client 100, respectively.)

Figure 4:
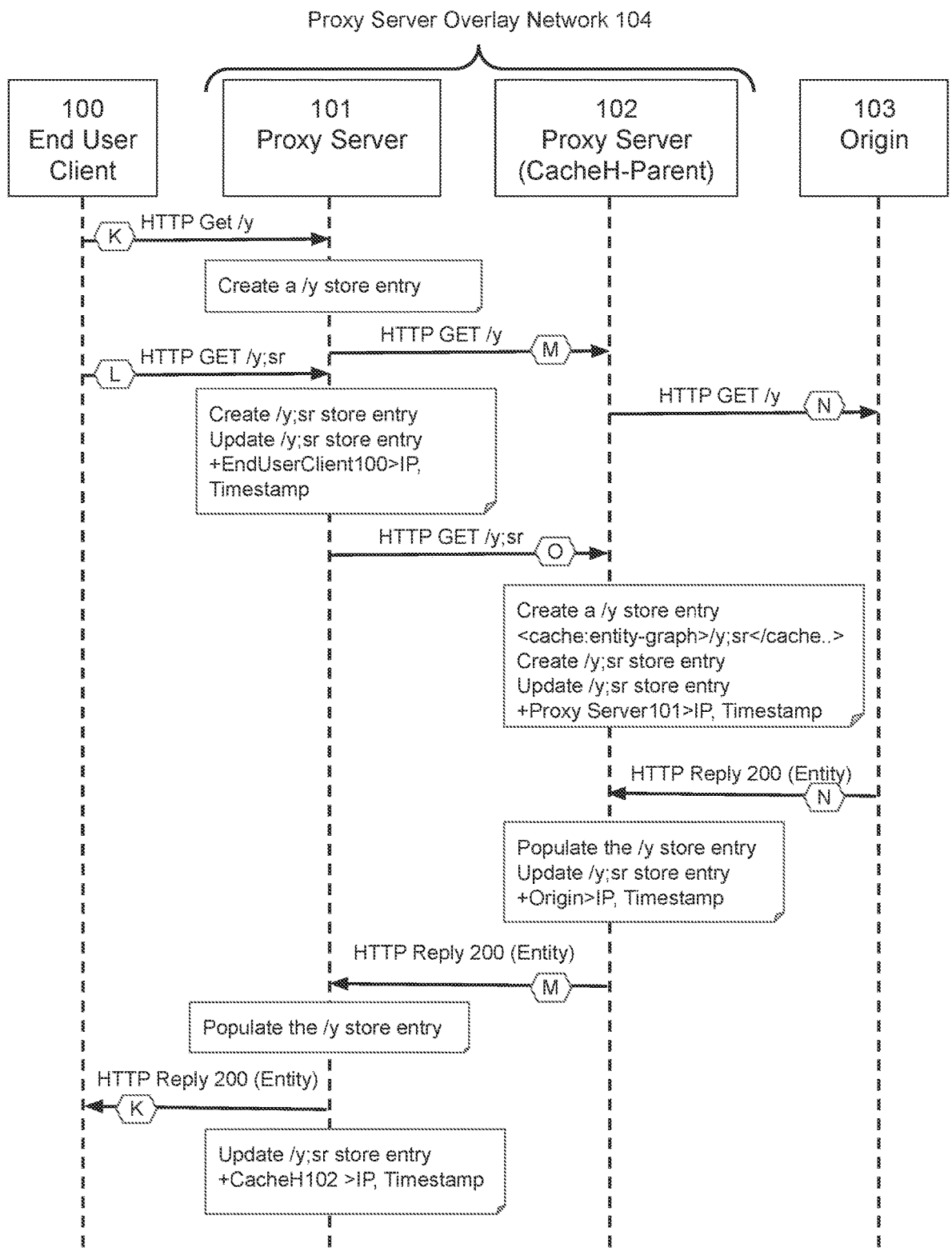
FIGS. 4-5 are sequence diagrams illustrating the building of an entity interest graph, where the end user client uses the notification channel directly, in accordance with one embodiment of the teachings hereof.
Figure 5:
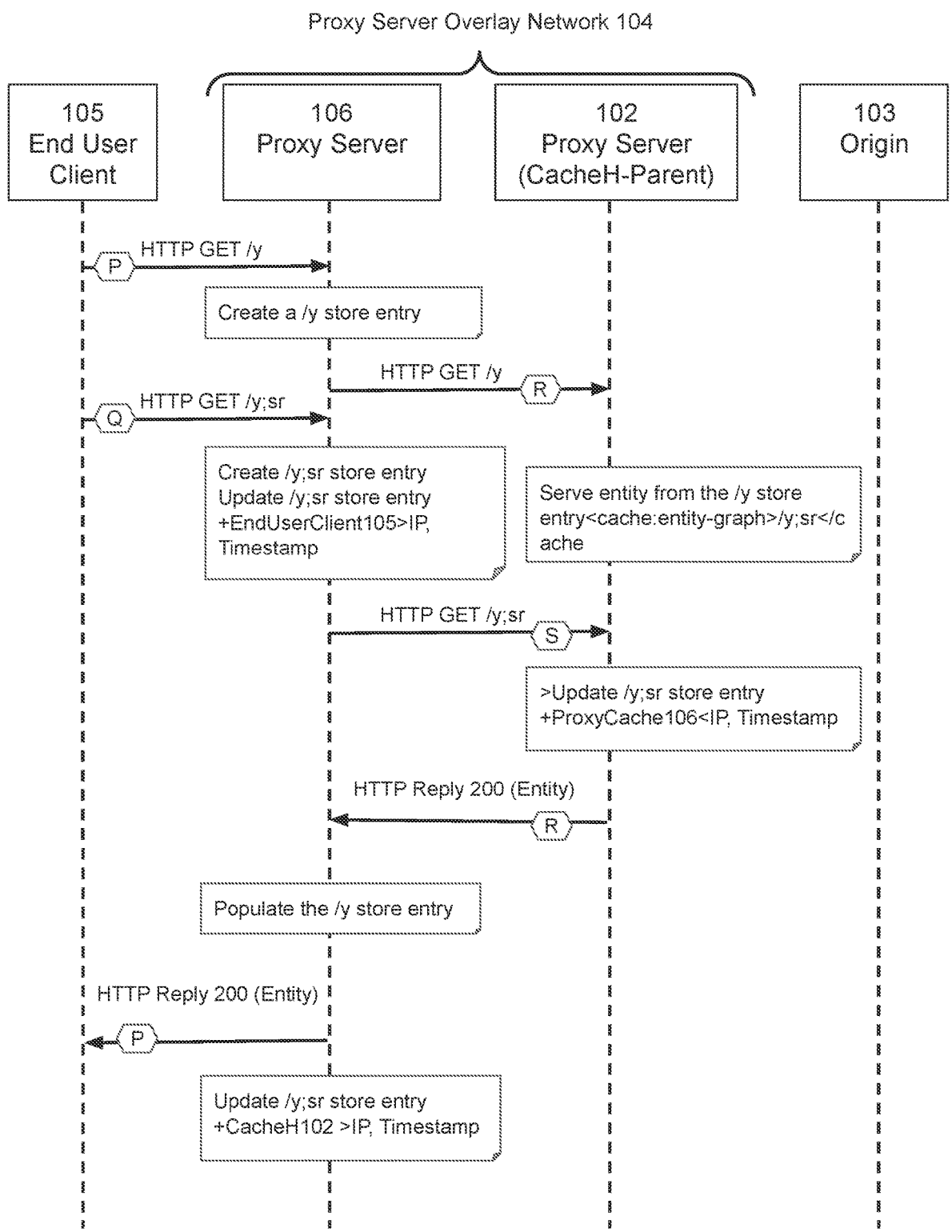

FIGS. 4 & 5: End User Client Supports Notification-Channel Interface

As mentioned earlier, an explicit indication of entity interest by an end user client could also be the basis for recording its downlink IP address in the notification channel store entry. FIGS. 4 and 5 illustrate the scenario in which end user clients are aware of and support the notification-channel interface, and an explicit indication of entity interest is used. Hence, FIGS. 4 and 5 correspond to FIGS. 1 and 2, respectively, but differ insofar as the end user client (100, 105) issues a request to the notification channel interface to request notifications of entity updates, in addition to requesting the entity itself via the entity interface. Such requests to the notification-channel interface can be held open by the proxy server 101, 106 in an HTTP 1.1 long-poll pattern, the proxy server responding to the request when the entity updates.

Figure 6:
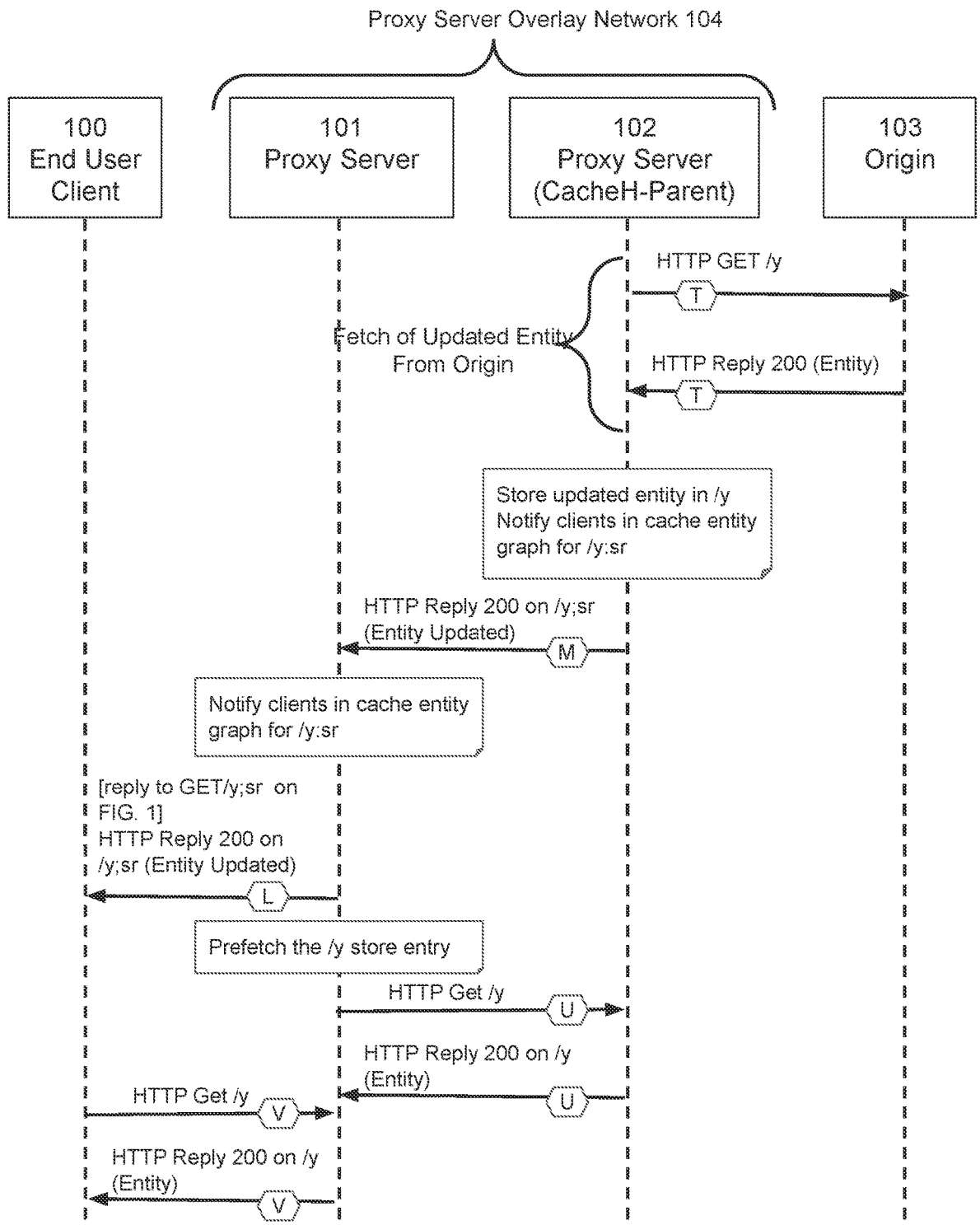
FIG. 6 is a sequence diagram illustrating notification of entity updates, in accordance with FIGS. 4-5.

Update Notification (FIG. 6)

With respect to FIGS. 4 and 5, entity update notifications can be implemented as follows (by way of example and not exhaustive):

Between CacheH-Parent 102 and Origin 103: long poll or H2 server push on the entity interface.

Between the Proxy 101 and CacheH-Parent 102: long-poll or H2 server push on the notification-channel interface.

Between End User Client 100 and Proxy 101: long poll or H2 server push on the entity interface.

FIG. 6 illustrates such update notifications as they cascade downstream, following FIGS. 4 and 5 (long polling illustrated rather than server push).

(The operations relating to proxy server 106 and end user client 105 are not shown in FIG. 6 but will be apparent to those skilled in the art from the following description, as they would parallel those of proxy server 101 and end user client 100, respectively.)

It is noted that FIGS. 1-6 show a proxy server or end user client issuing a notification channel request (/y;sr) directly after issuing the entity channel request (/y). Of course, those skilled in the art will understand that in some cases this timing might be different. An end-user client and/or proxy server might wait to issue the notification channel request until some later event (e.g., receipt of the entity). Relatedly, while they are depicted as serial operations for clarity in the figures, the server-side workflows for handling the entity channel request (fetching and serving the entity) and the notification channel request (creating and/or updating the /y;sr store entry) may occur concurrently and without blocking one another. I Generalizing, entity channel message exchanges may be synchronous, and notification channel message exchanges may be synchronous, but they need not be synchronous with each other.

Alternative Embodiments

A proxy server implementing the novel dual interface can support a wide variety of protocols, in addition to those illustrated in FIGS. 1-6. In general, the dual interface and associated operations may be used internally to the proxy server overlay network 104, by compatible end user clients to interface with proxy servers in the overlay network 104, and/or by compatible origin servers to communicate with proxy servers in the overlay network 104.

Figure 7:
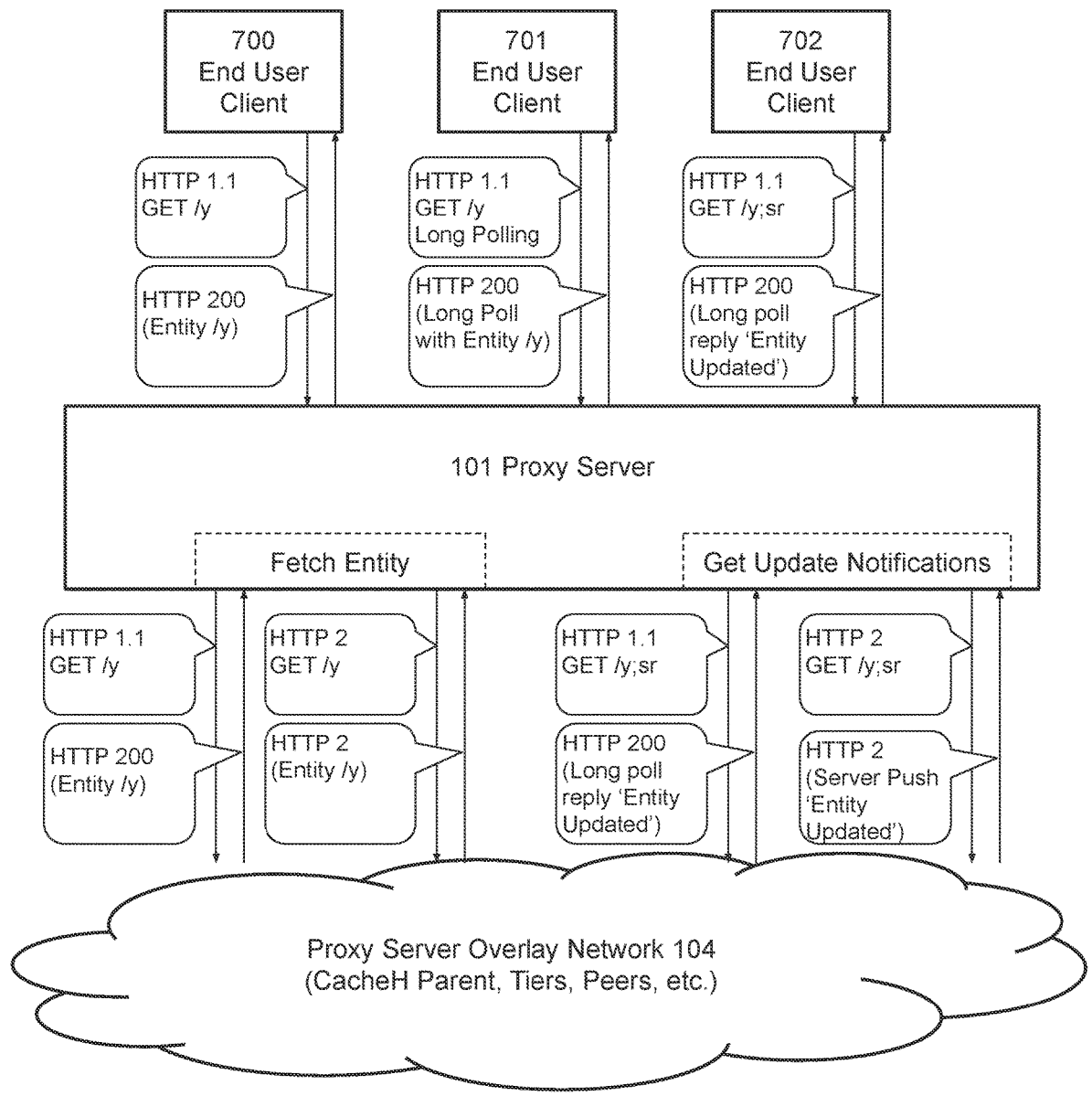
FIGS. 7-8 are diagrams illustrating various possible messaging patterns/protocols between the end user client and edge proxy server, and between the edge proxy server and other servers in the proxy server network 104.
Figure 8:
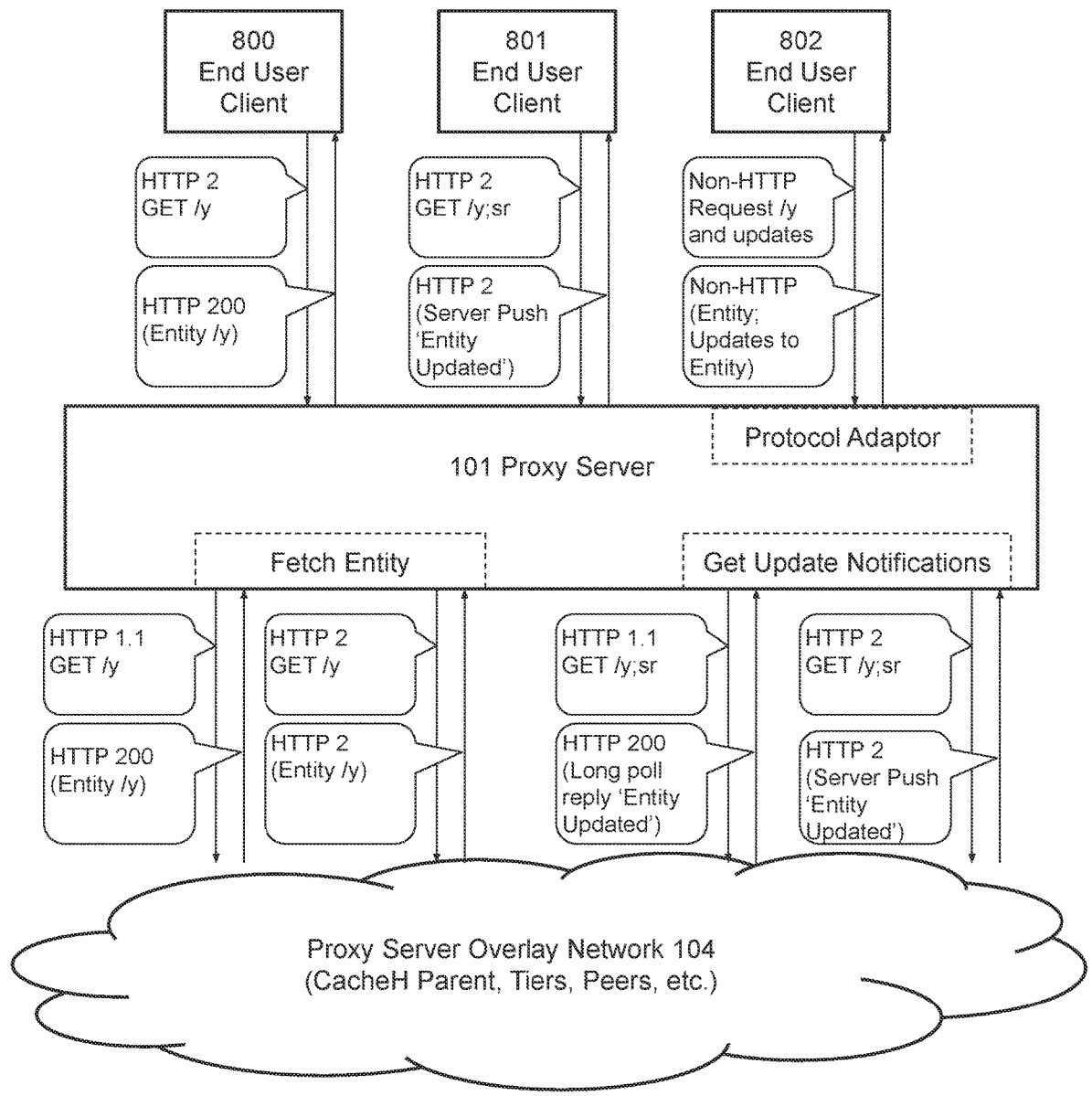

FIGS. 7-8 illustrate several end user clients using different protocols and patterns to request entities, request update notifications for entities, and/or to receive those update notifications. Note that while each pattern is shown as being associated with a differently labeled end user client (700, 701 etc.), in practice a given end user client typically supports multiple of the illustrated patterns.

With respect to FIG. 7:

End User Client 700 uses an HTTP 1.x GET on the entity interface to get the entity. No update notifications are provided (unless provided out of band). On the overlay network side, the proxy server 101 fetches the entity from upstream, and sends a request for update notifications (if not already in place).

End User Client 701 uses an HTTP 1.x long poll on the entity interface. It is notified of updates via a reply to the long poll (e.g., the reply including the updated entity). On the overlay network side, the proxy server 101 fetches the entity when it is notified of an update, and then sends it to the client 701 in the long poll reply.

End User Client 702 uses an HTTP 1.x long poll on the notification-channel interface. It is notified of an update via a reply to the long poll on that interface (e.g., optionally with the entity inline with the notification). On the overlay network side, the proxy server 101 requests entity update notifications (if not already in place).

On the proxy server network 104 side of the proxy server 101 (i.e., upstream to other proxies), the proxy server 101 can use an HTTP (1.x or 2) forward request to fetch the requested content entity on the upstream entity interfaces ("Fetch Entity"). To obtain update notifications, a long-poll or H2 session (with server push of notifications via push-promise frames) is used on notification-channel interface ("Get Update Notifications").

The proxy server 101 is able to ingest any of the end user client-side patterns and map the necessary function to the patterns to be used on the overlay network 104 side. Entity URIs can be translated to notification-channel URIs, and vice versa, using predefined transforms, as described earlier.

FIG. 8 is a continuation of FIG. 7 showing additional possibilities for the end user client patterns:

End User Client 800 uses an HTTP 2 GET on the entity interface to get the entity. This could be a long poll or not. On the overlay network side, the proxy server 101 fetches the entity from upstream, and sends a request for update notifications (if not already in place).

End User Client 801 uses an HTTP 2 GET on the notification-channel interface to request notifications about the entity. On the overlay network side, the proxy server 101 sends a request for update notifications (if not already in place). Notifications to the client 801 are provided via a notification message pushed by the server on the H2 session. The client could then request the entity if desired. More specifically, the server 101 can notify the End User client 801 via push promise of GET /y on the /y;sr stream and the updated /y is offered on a new stream pushing GET /y response.

End User Client 802 uses a non-HTTP protocol. This could be any messaging protocol understood by an end user client and a proxy server. In this case, the proxy server 101 operates in an adaptor pattern. The adaptor pattern means that the proxy server 101 binds to different message flow protocols to end user clients and/or to origin systems. The semantics of a given protocol (e.g., client wants an entity, client wants to receive notice when entity changes and it will decide whether to fetch, client wants pushed updates of every entity version) are mapped to the functions and services provided by the dual interface for communication inside the overlay network 104, as outlined herein. By doing so, a WebSocket messaging sub-protocol by end user clients (or origins) with proxy server 101 support such as MQTT or AMQP is possible.

Figure 9:
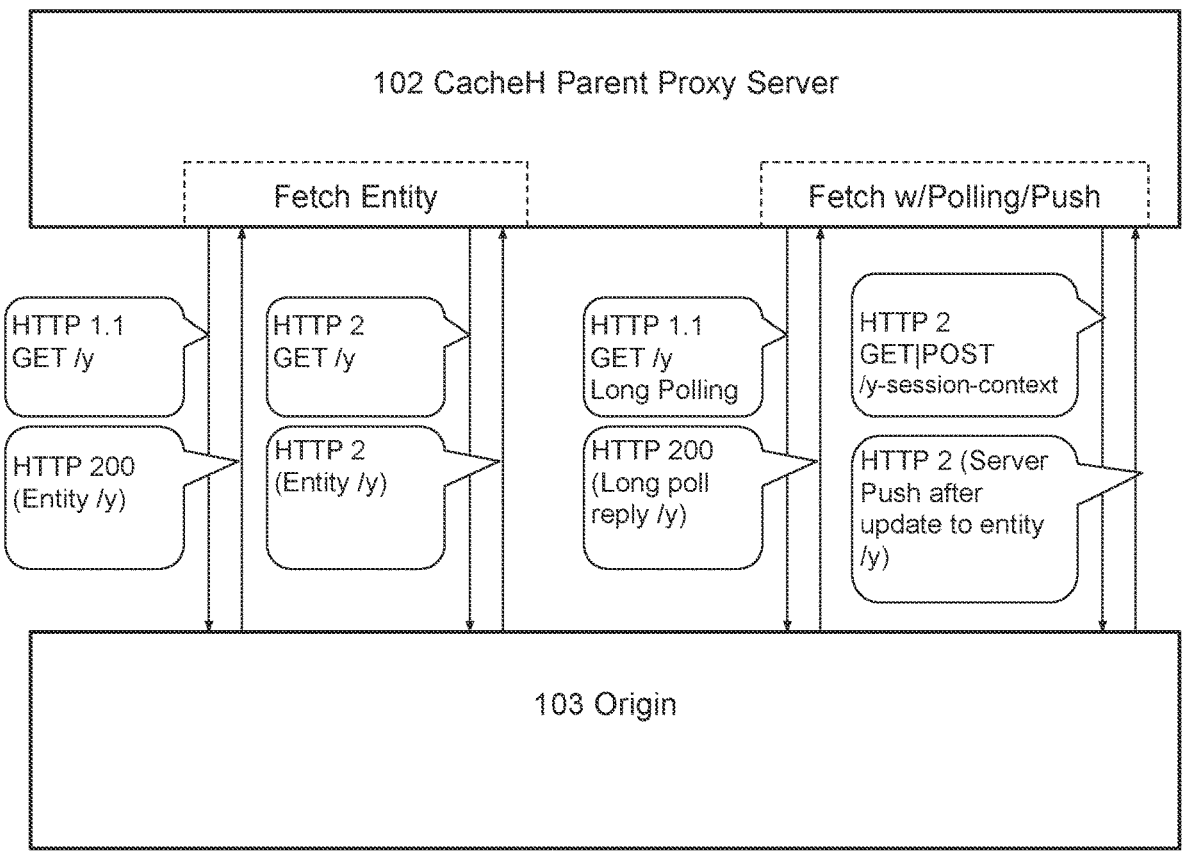
FIG. 9 is a diagram illustrating various possible messaging patterns/protocols between the origin 103 and a proxy server 102 in the proxy server network 104; and, FIG. 10 is a block diagram illustrating hardware in a computer system that may be used to implement the teachings hereof.

FIG. 9 illustrates the link between the CacheH-Parent 102 and Origin 103. If the origin 103 does not support the dual interface, then there are still several options available to the CacheH-Parent 102, all using the conventional /y entity interface:

Fetch the entity using HTTP 1.1 or 2 request (e.g., Interval Polling, IMS requests).

Fetch the entity using HTTP 1.1 long polling. Or, use H2, for example by requesting /y-session-context and the origin 103 holding the session open (e.g., persistent connection) so as to get push updates to the entity. (Note that if the origin 103 supported the notification channel interface, the CacheParent 102 might alternatively request /y;sr for this purpose.)

Use the adaptor pattern on the origin side, as already mentioned.

In the context of FIGS. 7-9 should be understood that the overlay network may contain any number of tiers. Each tier can be configured independently with respect to the teachings in this document. Some tiers may support the dual interface, notification channel, or aspects thereof, while others may not. Similarly, within a given tier, some clients may support them, while others do not. Hence, by way of example, a proxy server may field entity requests from clients that do not support the notification channel, but nevertheless it may subscribe to notification upstream on behalf of that client for a range of reasons, e.g., to keep the object fresh, or because the client supports another kind of channel for getting updates or entities which the proxy server is supporting at the edge.

Cache Optimizations—Override TTL for Known-Current Entities

A proxy server can initiate a synchronous entity refresh when the entity request gets a cache hit on a client request and the entity's TTL is expired. If there is an active long-poll request running to get update notifications, the proxy server knows that the entity has not been updated, so the cached entity is actually not stale even when TTL is expired, i.e., there is no strict need for an IMS. In this case the proxy server serving a "stale" object is an optimization.

Cache Optimization—Prefresh

An asynchronous prefetch, if configured, can be initiated by a proxy server right before the entity expires in its entity store entry (this is sometimes referred to as a prefresh; prefreshing itself is conventional and known in the art by others). In the context of the teachings hereof, an active long-poll request will notify on the entity update, so the prefresh based on TTL is less efficient than based on the real-time notification. It is assumed that when the real-time update channel is open the prefresh could be deferred/overridden as an optimization.

Optional Cache Update for Recently Active Branches

In accord with the teachings hereof, a proxy server records all recent entity interest together with the notification channel interest from downstream links with the timestamp of the latest communication. An active long-poll request or other form of expressed client interest in receiving updates will trigger cache invalidation/prefresh on that client's downlink path. The system can be optionally configured to push the cache update (prefresh) requests to recently connected downlinks without active requests or expressions of interest in updates. This should improve cache hits for users reconnecting to the same proxy server during the HTTP long-poll restart or for new users being mapped to the same proxy server some time later.

Forwarding Solicit Response

A proxy server uses a forward configuration to compute IP addresses to connect to for entity request forwarding. Using the forward configuration also for notification-channel request forwarding might not converge on the same forward host. This might introduce a fragmenting of the interest graph and a steady rate of failed notification-channel requests that land on a forward host not having a notification-channel store entry. It is assumed that the entity interest graph shall be used by notification-channel request to ensure it follows the forwarding configuration and mapping decisions exactly. The notification-channel request forwarding behavior is preferably configurable, e.g.:

a. Forward notification-channel request to the uplink stored in the entity interest graph store entry, or
b. Forward notification-channel request using entity request forward configuration.

Relating Client Interest in an Entity Update Notification to Potential Interest in Other Entities and/or Entity Update Notifications.

In some cases, downstream client interest in a given entity (whether implicit or explicit) can be converted to upstream requests for multiple entities on their entity interfaces, and/or upstream requests for updates about multiple entities on their notification channel interfaces. A proxy server may execute edge logic to determine the upstream requests that are triggered by a given client expression of interest.

For example, it is known in the art to prefetch content to a cache in anticipation of client requests for it. For example, if a client requests a markup language document, the server can provide it, but also read the document to find embedded entity resources which the client is likely to soon request, and then prefetch such entity resources from origin. Other approaches involve tracking patterns of client requests and then making predictions about the next likely object, or web page. The dual interface enables this concept for entity update notifications. That is, a markup language document or other application layer document being handled by the proxy server may express relationships between entity resources that can be applied to notification-channel resources. Or they may express relationships between notification-channel resources directly. In this way, a proxy server in receipt of an update notification that one entity has been updated might be able to determine, based thereon, that a related entity resource has also been updated.

Another example involves subscribing to updates for multiple topics in a publish-subscribe style messaging system. Suppose a client expresses interest in a topic using a wildcard expression that encompasses N different topics. The proxy server can convert this request into an upstream update request on the notification channel for each of the N topics.

Yet another example relates to flexible caching, in which multiple versions of an entity (e.g., an image in multiple resolutions) are cached in a single entity store entry, such that the proxy server can extract and serve any of them. If a client expresses interest in one version of an entity, the proxy server can fetch all the versions from upstream and/or request notifications of updates to any of the versions.

A final example relates to edge computing. Suppose a client requests an entity /y that is actually constructed (e.g., at the proxy) from constituent entities /y_1 and /y_2 and /y_3. where each of /y_n are pieces of information available from upstream. The proxy server can convert the request for the entity /y to multiple requests upstream for the entities /y_n and for updates thereto on /y_n;sr. If any one of the constituent entities is updated, the proxy server knows it has to recalculate /y and (if supported) notify the client of an update to /y.

Additional Embodiments

Those skilled in the art will appreciate that many different embodiments are possible based on the above teachings, and that the teachings hereof may be implemented in a variety of ways. Some additional embodiments are now described.

In some embodiments, a client's expression of entity interest may extend to specified conditions only. This can allow for more fine-grained update notifications than only on whether an entity has changed. One example was alluded to earlier: a client could express interest in an entity for a limited period of time, i.e., attaching a TTL value to the request it makes for the entity resource or notification channel resource (e.g. in a HTTP header). Likewise, a client could add a tag indicating that the client does not care about updates before a certain time (a kind of rate-limiting). A client could also attach to its request a tag that limits or focuses its expression of interest in the entity to some attribute thereof, such as a type, certain size, value passing a threshold, specific value, rapidity of changes, or anything else.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 10:
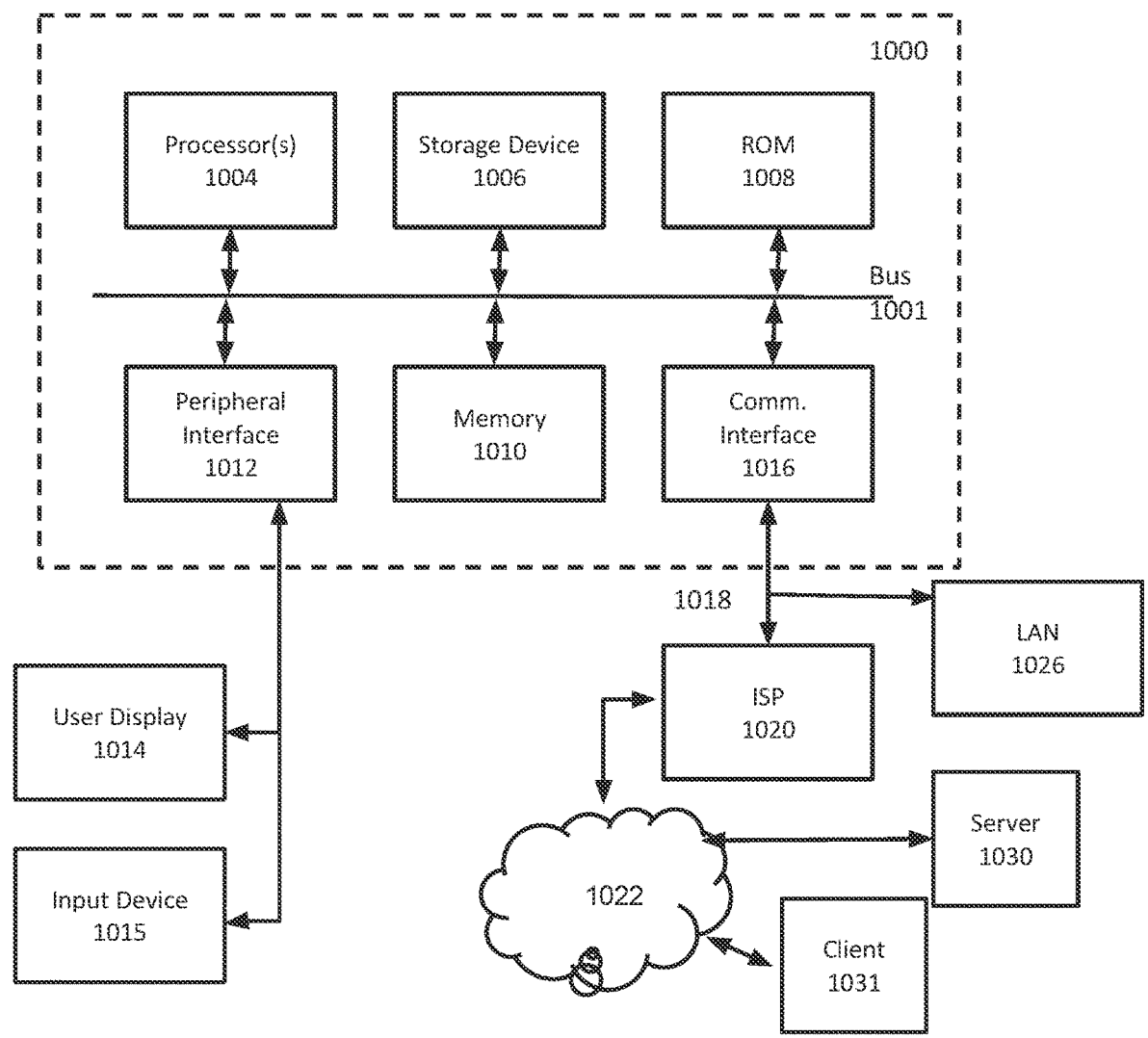

FIG. 10 is a block diagram that illustrates hardware in a computer system 1000 upon which such software may run in order to implement embodiments of the invention. The computer system 1000 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 1000 includes a microprocessor 1004 coupled to bus 1001. In some systems, multiple processor and/or processor cores may be employed. Computer system 1000 further includes a main memory 1010, such as a random access memory (RAM) or other storage device, coupled to the bus 1001 for storing information and instructions to be executed by processor 1004. A read only memory (ROM) 1008 is coupled to the bus 1001 for storing information and instructions for processor 1004. A non-volatile storage device 1006, such as a magnetic disk, solid state memory (e.g., flash memory), or optical disk, is provided and coupled to bus 1001 for storing information and instructions. Other application-specific integrated circuits (ASICs), field programmable gate arrays (FPGAs) or circuitry may be included in the computer system 1000 to perform functions described herein.

A peripheral interface 1012 may be provided to communicatively couple computer system 1000 to a user display 1014 that displays the output of software executing on the computer system, and an input device 1015 (e.g., a keyboard, mouse, trackpad, touchscreen) that communicates user input and instructions to the computer system 1000. However, in many embodiments, a computer system 1000 may not have a user interface beyond a network port, e.g., in the case of a server in a rack. The peripheral interface 1012 may include interface circuitry, control and/or level-shifting logic for local buses such as RS-485, Universal Serial Bus (USB), IEEE 1394, or other communication links.

Computer system 1000 is coupled to a communication interface 1016 that provides a link (e.g., at a physical layer, data link layer,) between the system bus 1001 and an external communication link. The communication interface 1016 provides a network link 1018. The communication interface 1016 may represent an Ethernet or other network interface card (NIC), a wireless interface, modem, an optical interface, or other kind of input/output interface.

Network link 1018 provides data communication through one or more networks to other devices. Such devices include other computer systems that are part of a local area network (LAN) 1026. Furthermore, the network link 1018 provides a link, via an internet service provider (ISP) 1020, to the Internet 1022. In turn, the Internet 1022 may provide a link to other computing systems such as a remote server 1030 and/or a remote client 1031. Network link 1018 and such networks may transmit data using packet-switched, circuit-switched, or other data-transmission approaches.

In operation, the computer system 1000 may implement the functionality described herein as a result of the processor executing code. Such code may be read from or stored on a non-transitory computer-readable medium, such as memory 1010, ROM 1008, or storage device 1006. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 1018 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method of providing a service from a network of HTTP proxy servers on the Internet, comprising, at an HTTP proxy server in the network of HTTP proxy servers:
   a. for an entity cached at the HTTP proxy server:
      providing a first store entry in a cache, addressable at a first URI and storing the entity, so as to make the entity available to clients upon request to the first URI;
      providing a second store entry in the cache, addressable at a second URI and storing client interest in being notified about updates to the entity with notification messages;

b. receiving, from one or more clients, one or more messages expressing client interest in being notified about updates to the entity, the one or more messages being received at any of the first and second URIs;

c. where the one or more clients comprise any of (i) end-user clients and (ii) other HTTP proxy servers in the network of HTTP proxy servers;

d. responsive to the one or more messages, recording client interest of the one or more clients in the second store entry;

e. issuing a consolidated forward request, on behalf of all of the one or more clients, to another HTTP proxy server in the network of HTTP proxy servers, the consolidated forward request expressing interest in being notified of updates to the entity;

f. responsive to the consolidated forward request, receiving from the another HTTP proxy server a notification message about an update to the entity; and, g. sending downstream notification messages, about the update to the entity, to the one or more clients recorded in the second store entry, the HTTP proxy server making the updated entity available to the one or more clients at the first URI.

2. The method of claim 1, wherein the HTTP proxy server computes at least one of:
the second URI from the first URI, and,
the first URI from the second URI.

3. The method of claim 1, wherein the HTTP proxy server issues the consolidated forward request to the another HTTP proxy server, which comprises a parent server in a cache hierarchy.

4. The method of claim 1, wherein the one or more clients comprise: (i) end-user clients.

5. The method of claim 1, wherein the one or more clients comprise: (ii) other proxy servers in the network of HTTP proxy servers.

6. The method of claim 1, wherein the one or more messages expressing client interest in being notified about updates to the entity comprise at least one of:
an HTTP request directed to the first URI;
an HTTP request directed to the second URI; and,
a non-HTTP request directed to the first URI.

7. The method of claim 1, wherein the consolidated forward request and responsive notification message comprise at least one of:
an HTTP 1.x long polling operation; and,
an HTTP/2 request and a server push.

8. The method of claim 7, wherein the consolidated forward request is directed to a corresponding second URI of the another HTTP proxy server.

9. The method of claim 1, the recording of client interest comprising storing client identifiers.

10. The method of claim 1, further comprising, prefetching the entity upon receipt of the notification message about the update to the entity.

11. The method of claim 1, wherein the entity represents a message for the one or more clients.

12. The method of claim 1, wherein the entity represents a topic in a publish-subscribe system.

13. Apparatus comprising a computer having at least one hardware processor and memory storing computer program instructions for execution on the at least one hardware processor to provide an HTTP proxy server in a network of HTTP proxy servers, the computer program instructions including computer program instructions executable to cause the HTTP proxy server to:

a. for an entity cached at the HTTP proxy server:
provide a first store entry in a cache, addressable at a first URI and storing the entity, so as to make the entity available to clients upon request to the first URI;
provide a second store entry in the cache, addressable at a second URI and storing client interest in being notified about updates to the entity with notification messages;

b. receive, from one or more clients, one or more messages expressing client interest in being notified about updates to the entity, the one or more messages being received at any of the first and second URIs;

c. where the one or more clients comprise any of (i) end-user clients and (ii) other HTTP proxy servers in the network of HTTP proxy servers;

d. responsive to the one or more messages, record client interest of the one or more clients in the second store entry;

e. issue a consolidated forward request, on behalf of all of the one or more clients, to another HTTP proxy server in the network of HTTP proxy servers, the consolidated forward request expressing interest in being notified of updates to the entity;

f. responsive to the consolidated forward request, receive from the another HTTP proxy server a notification message about an update to the entity; and, g. send downstream notification messages, about the update to the entity, to the one or more clients recorded in the second store entry, and make the updated entity available to the one or more clients at the first URI.

14. A method of providing a service via an overlay network of HTTP proxy servers, comprising, at a given HTTP proxy server in the overlay network of HTTP proxy servers:

a. providing an HTTP service to clients, the clients comprising any of end-user clients and other HTTP proxy servers in the overlay network;

b. wherein the HTTP service includes a dual interface for each entity cacheable at the given HTTP proxy server, the dual interface providing to clients:
a method associated with a first URI for obtaining a current version of an entity that is stored in the a first cache entry in a local cache of the given HTTP proxy server; and,
a method associated with a second URI for obtaining notifications of updates to the entity that is stored in the first cache entry;
wherein the second URI is associated with a second cache entry in the local cache that stores data indicating client interest in being notified of updates to the entity stored in the first cache entry.

15. The method of claim 14, wherein the second URI is computable from the first URI by the given HTTP proxy server according to a predetermined function.

16. The method of claim 14, wherein the first URI is computable from the second URI by the given HTTP proxy server according to a predetermined function.

17. The method of claim 14, wherein the entity represents a message for clients.

18. The method of claim 14, wherein the entity represents a topic in a publish-subscribe system.

19. Apparatus comprising a computer having at least one hardware processor and memory storing computer program instructions for execution on the at least one hardware processor to provide an HTTP proxy server in an overlay network of HTTP proxy servers, the computer program instructions including computer program instructions executable to cause the HTTP proxy server to:

a. provide an HTTP service to clients, the clients comprising any of end-user clients and other HTTP proxy servers in the overlay network;

b. wherein the HTTP service includes a dual interface for each entity cacheable at the HTTP proxy server, the dual interface providing to clients:

a method associated with a first URI for obtaining a current version of an entity that is stored in the a first cache entry in a local cache of the HTTP proxy server; and, a method associated with a second URI for obtaining notifications of updates to the entity that is stored in the first cache entry;

wherein the second URI is associated with a second cache entry in the local cache that stores data indicating client interest in being notified of updates to the entity stored in the first cache entry.

* * * * *